(12) United States Patent
Heitmeyer

(10) Patent No.: US 8,371,544 B2
(45) Date of Patent: Feb. 12, 2013

(54) PIPE ANCHOR FOR RAILROAD CAR

(75) Inventor: Kristofer M. Heitmeyer, West Linn, OR (US)

(73) Assignee: Gunderson LLC, Portland, OR (US)

( * ) Notice: Subject to any disclaimer, the term of this patent is extended or adjusted under 35 U.S.C. 154(b) by 228 days.

(21) Appl. No.: 12/806,791

(22) Filed: Aug. 19, 2010

(65) Prior Publication Data

US 2012/0043432 A1 Feb. 23, 2012

(51) Int. Cl.
*A47B 96/06* (2006.01)

(52) U.S. Cl. .................. 248/229.1; 248/229.11

(58) Field of Classification Search .......... 24/16 R, 24/20 R, 703.1, 21, 25; 248/226.11, 227.4, 248/230.1, 230.3, 230.2, 230.5, 231.41, 231.61, 248/316.2, 316.4, 316.6, 221.11, 222.11, 248/222.13, 224.7, 229.1, 229.11, 229.12, 248/229.14
See application file for complete search history.

(56) References Cited

U.S. PATENT DOCUMENTS

| | | | |
|---|---|---|---|
| 1,821,295 A | 9/1931 | Dieter | |
| 2,454,064 A | 11/1948 | Johnson | |
| 2,546,792 A | 3/1951 | Smith et al. | |
| 2,625,354 A | 1/1953 | Smith | |
| 4,102,524 A | 7/1978 | Cseri | |
| 4,222,538 A * | 9/1980 | Jensen et al. | 248/56 |
| 5,330,140 A | 7/1994 | Cseri | |
| 5,370,344 A * | 12/1994 | Nadherny | 248/56 |
| 5,395,079 A | 3/1995 | Jensen et al. | |
| 5,472,158 A * | 12/1995 | Nadherny | 248/56 |
| 5,601,262 A | 2/1997 | Wright | |
| 5,605,309 A | 2/1997 | Nadherny | |
| 5,624,089 A | 4/1997 | Nadherny et al. | |
| 5,743,498 A | 4/1998 | Kampf | |
| 5,860,681 A | 1/1999 | Slais | |
| 2010/0144173 A1* | 6/2010 | Wason | 439/100 |

* cited by examiner

*Primary Examiner* — Alfred J Wujciak
(74) *Attorney, Agent, or Firm* — Chernoff Vilhauer McClung & Stenzel LLP

(57) ABSTRACT

An assembly such as a pipe anchor to be mounted on a structural support member to hold a pipe or other elongate article in a desired location. A base portion includes a cradle having slide channels on a pair of opposite side walls. A clamping body includes flanges that fit in the slide channels. Locking tabs that may be extensions of the flanges may be bent to engage retention faces of retainer legs on the base portion to keep the clamping body in place, yet permit it to be removed by straightening the locking tabs.

15 Claims, 5 Drawing Sheets

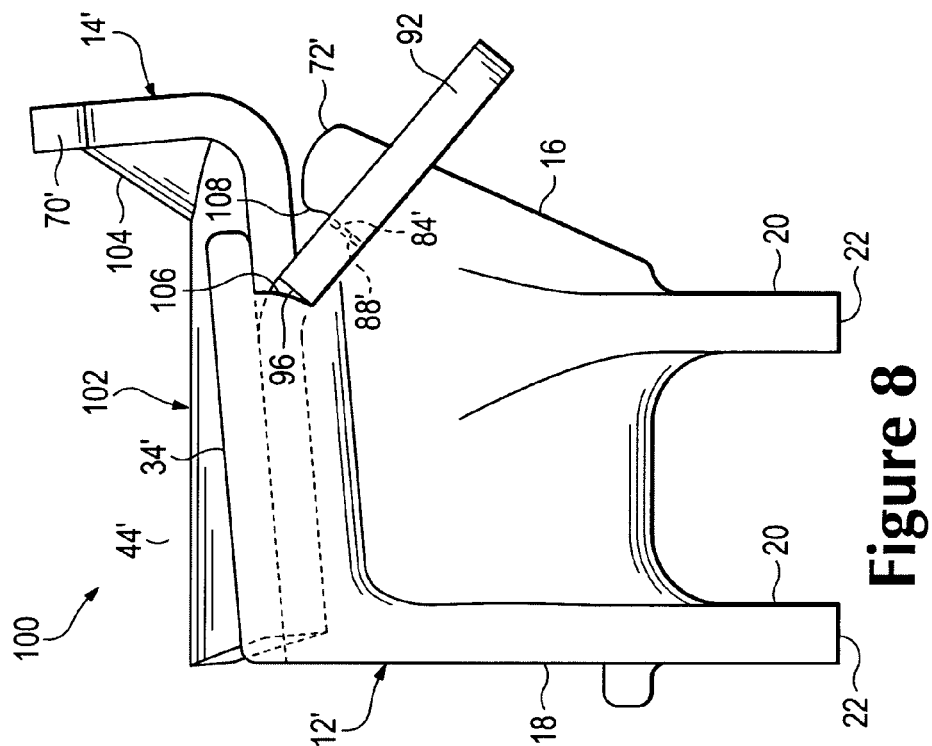
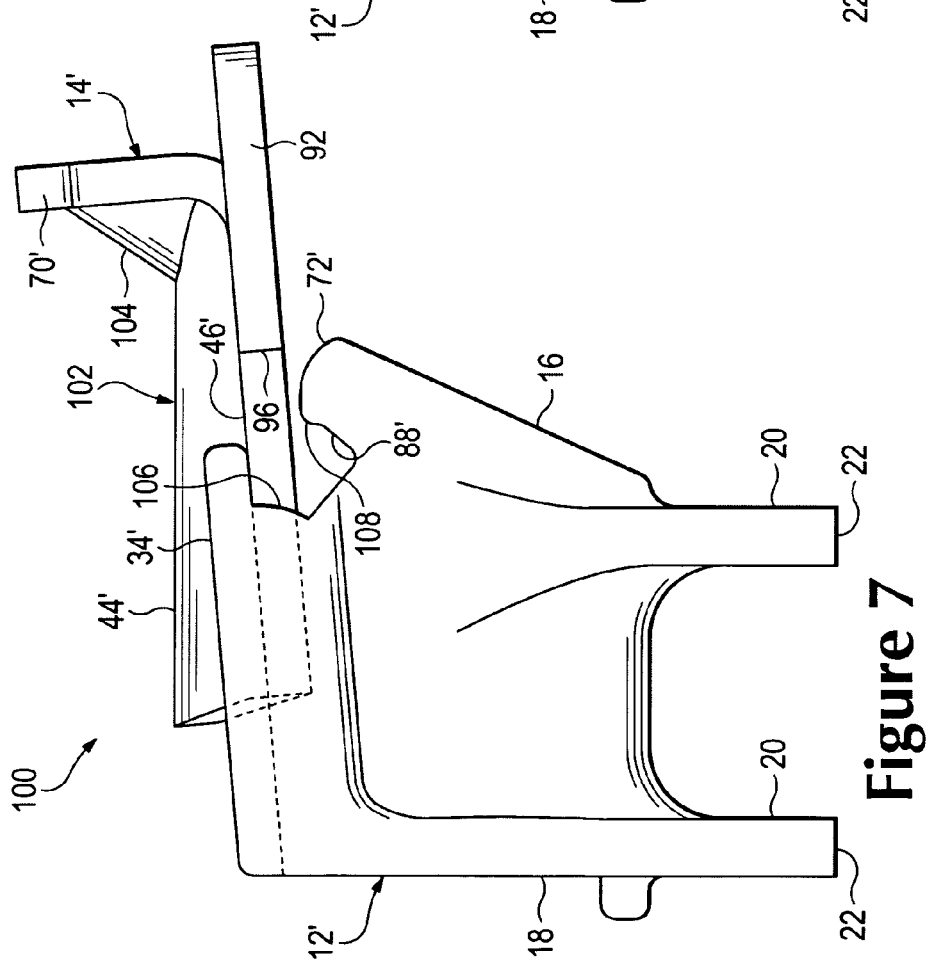

PIPE ANCHOR FOR RAILROAD CAR

BACKGROUND OF THE INVENTION

The present invention relates to an assembly for anchoring a slender object such as a length of pipe to a generally rigid structural support member of, for example, a railroad car.

Pipe anchors are used in railroad cars to secure air lines and other pipes to structural members of the cars. At times during the useful existence of a car it may be necessary to remove and replace a pipe held by such an anchor. Releasing a pipe from previously known pipe anchors often resulted in needing to cut away a base portion of a pipe anchor from the railroad car because of failure of a portion of the base member bent to release the pipe.

Not only is replacement of the base portion of a pipe anchor time-consuming, but the base portion is often of relatively costly forged construction.

What is desired, then, is a support assembly such as a pipe anchor for attaching a pipe or other slender elongate objects to supporting structures and which permits a pipe or other article to be removed from the supporting structure and replaced numerous times without having to cut a base of the assembly free from a structural member to which it might be welded. It is also desired to provide a pipe anchor incorporating a structure that may be manufactured at a relatively low cost.

SUMMARY OF THE INVENTION

The present invention provides an answer to the above-mentioned needs by providing an anchoring assembly defined by the claims which form a part of this disclosure and that may be used as a pipe anchor, in which a base portion retains a clamping body that can be locked into a required position without having to bend the base portion.

In one embodiment of the anchoring assembly disclosed herein a base portion includes a cradle and a pair of channels extending along opposite sides of the cradle. A corresponding clamping body has a saddle and flanges that may be engaged in the channels by sliding along the channels to place the saddle in a required location.

In one embodiment of the anchoring assembly, a tab on the clamping body may be bent into a position of engagement against a retainer leg of the base portion, to keep the clamping body in a position required to securely grasp and hold an article such as a pipe in the cradle. The tab may be straightened to permit removal of the clamping body as necessary, and may thereafter be again bent to retain the clamping body in a mating relationship with the base.

In one embodiment of the anchoring assembly, the base may be a metal casting.

In one embodiment of the anchoring assembly, the clamping body may be of metal plate cut and bent to shape.

The foregoing and other features of the invention will be more readily understood upon consideration of the following detailed description taken in conjunction with the accompanying drawings.

BRIEF DESCRIPTION OF THE DRAWINGS

FIG. 7 is a side elevational view of a pipe anchor which is an alternative embodiment of the apparatus disclosed herein, showing the clamping body engaged with the base portion, but not in a position of full engagement with the base portion.

FIG. 8 is a side elevational view of the pipe anchor shown in FIG. 7, with the clamping body fully installed and retained in place by bending the locking tab of the clamping body into engagement with the base portion.

DETAILED DESCRIPTION OF EMBODIMENTS

Figure 1:
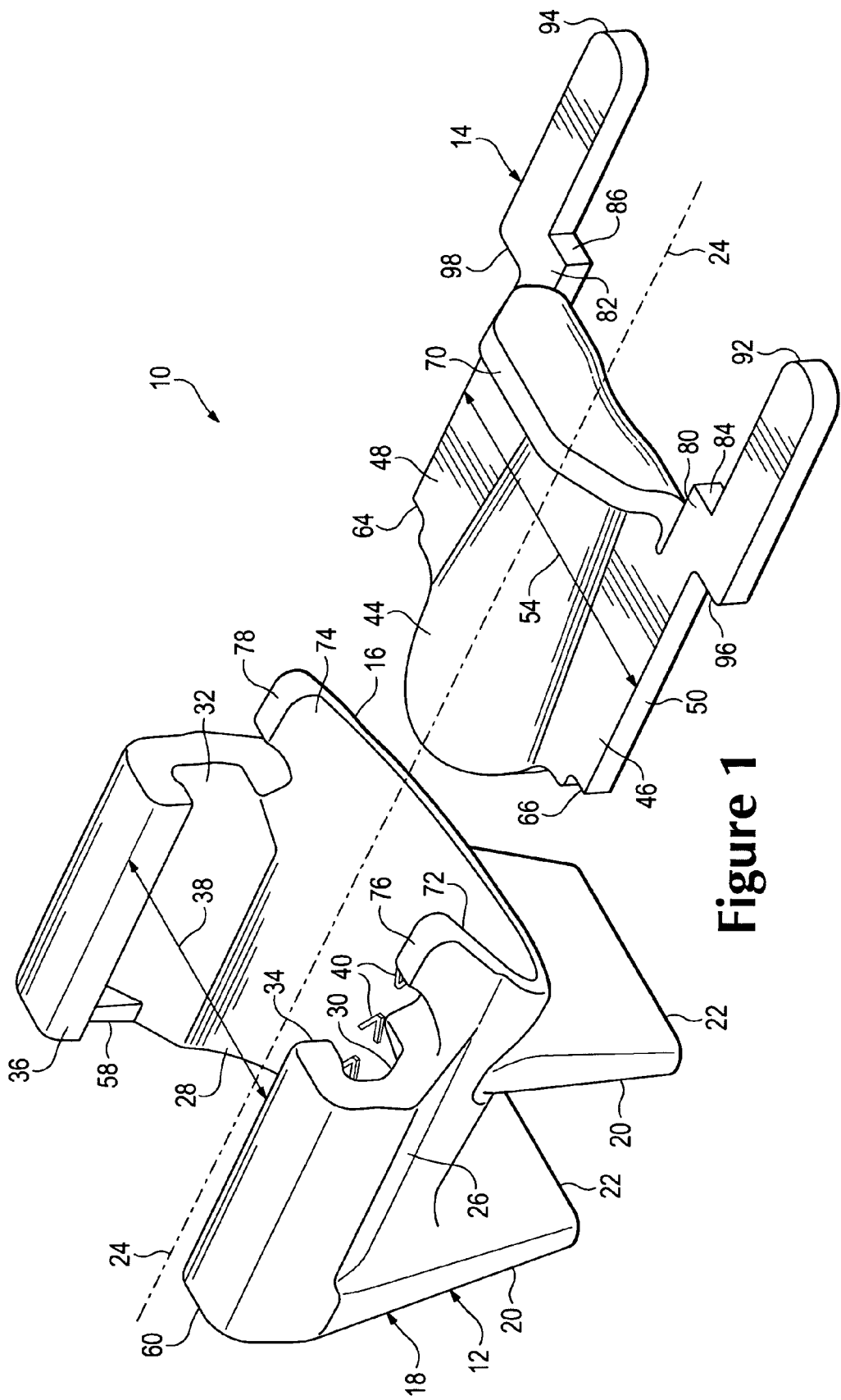
FIG. 1 is an isometric view of an assembly including a pipe anchor which is an exemplary embodiment of the invention disclosed herein, with a clamping body portion of the pipe anchor shown aligned with the base portion and ready for installation.

Referring now to the drawings which form a part of the disclosure herein, in FIG. 1 a pipe anchor 10 is shown with its base portion 12 and its clamping body 14 disengaged from each other, but with the clamping body 14 shown aligned with and ready for insertion into mating engagement with the base portion 12.

Figure 4:
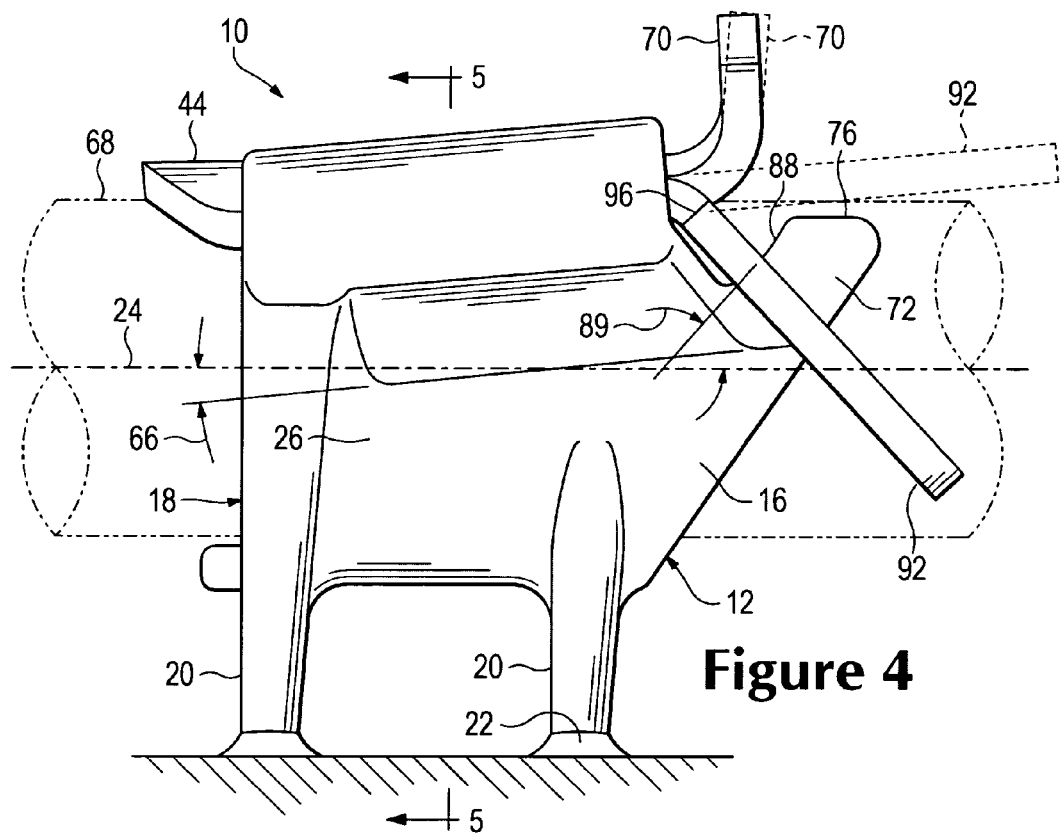
FIG. 4 is a side elevational view of the pipe anchor assembly in the configuration shown in FIG. 2.
Figure 5:
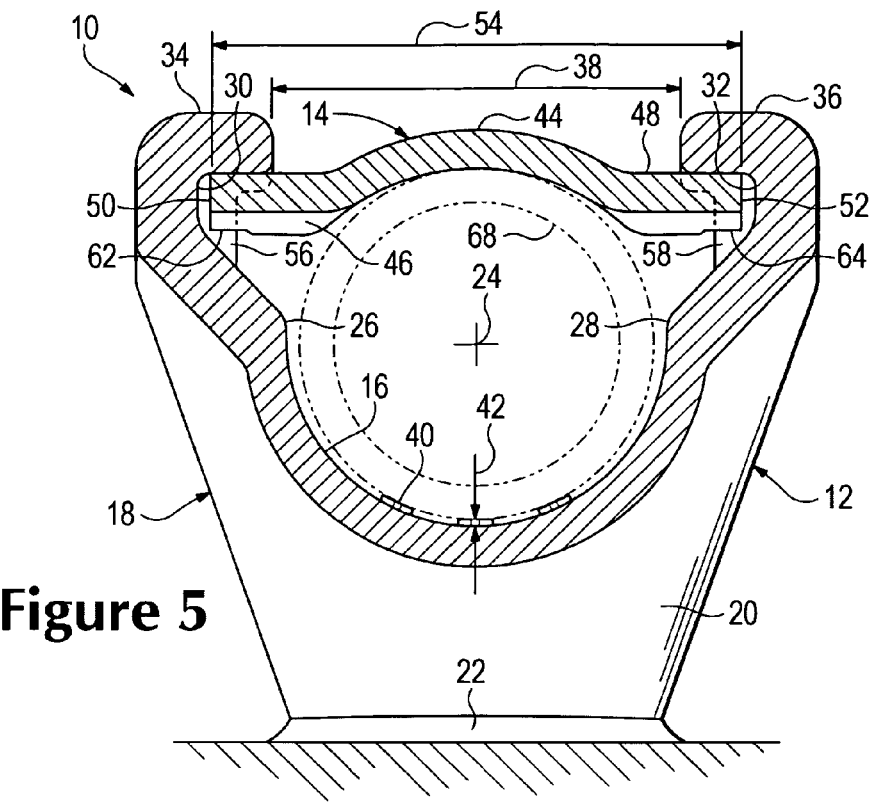
FIG. 5 is a sectional view taken along line 5-5 of FIG. 4.
Figure 6:
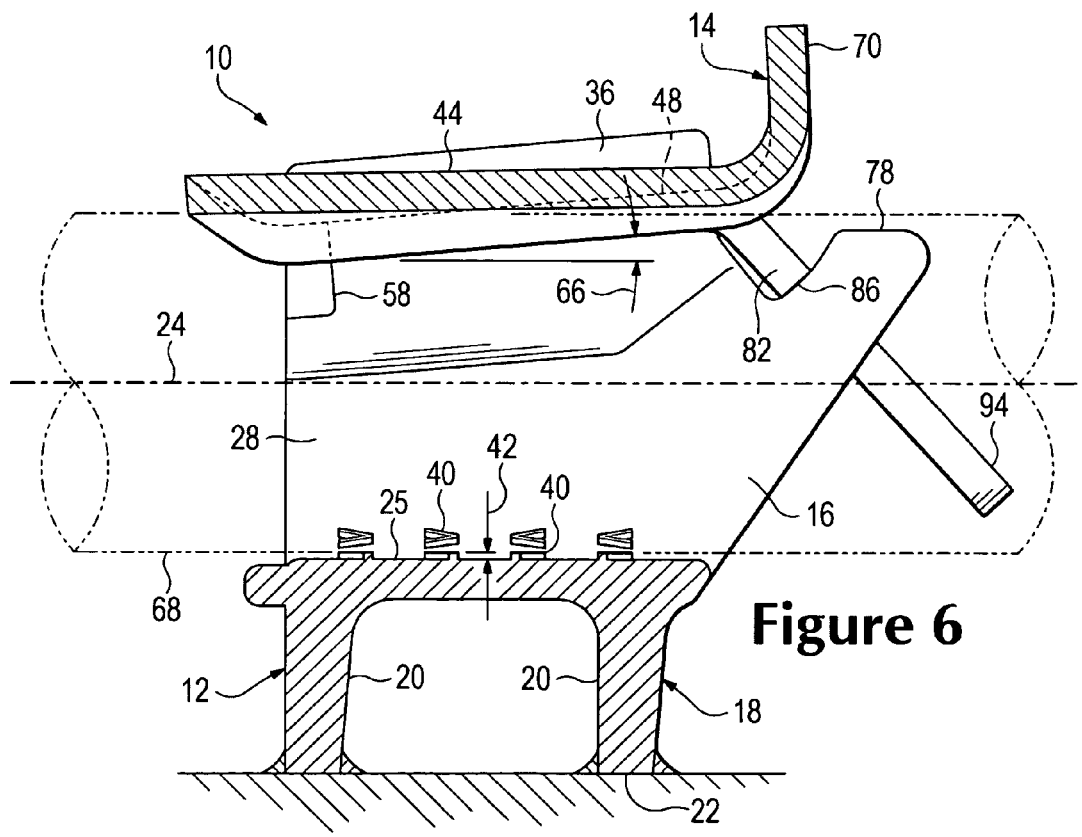
FIG. 6 is a sectional view taken along line 6-6 of FIG. 2.

The base portion 12 includes a generally semi-cylindrical cradle 16 carried on a mounting body 18. The mounting body 18 may include a pair of plate-like legs 20 each having a bottom end or foot 22 that may be flat, in order to allow the base portion 12 to be welded conveniently to a flat surface. The pipe anchor 10 thus may be mounted on a supporting structure of a railcar or other structure by welding the feet 22 to the supporting structure, as shown in FIGS. 4-6. Alternatively, the feet 22 may be shaped differently to fit into a desired location on a surface that is not flat, or the legs 20 could be provided with other types of feet, including receptacles for rivets, screws, or other types of fasteners to mount the base on a structural support member. The base portion 12 may be cast of steel or other weldable metal, or if desired, it could be forged or machined.

The cradle 16 defines a central axis 24 that may extend parallel with a bottom 25 of the interior of the cradle 16, coincident with a central axis of a cylindrical body, such as a pipe, to be held in the pipe anchor 10. A pair of opposite sides 26 and 28 extend upward from a generally cylindrical shape of the cradle 16 when the base portion 12 is oriented as shown in FIG. 1. A pair of channels 30 and 32 extend along upper portions of the sides 26 and 28, parallel with each other and facing inwardly and openly toward each other. Rails 34 and 36 extend parallel with each other and define the upper sides of the channels 30 and 32, respectively, and are spaced apart from each other by a distance 38 great enough to admit a body such as a pipe to be placed into the cradle 16 by passing between the rails 34 and 36, so that the pipe or other body can rest against the bottom 25 of the cradle 16 between its sides 26 and 28.

Small raised projections or teeth such as chevrons 40 may be present within the cradle 16 to protrude radially inward from the interior surface of the cradle 16 by a small height 42, as may be seen best in FIG. 6. Such chevrons 40 or other small projections may have sharp edges and are intended to engage an outer surface of an article such as a pipe intended to be held in the pipe anchor 10.

The clamping body 14 includes a centrally-located saddle 44 which may have a generally cylindrical interior form facing downward, toward the interior of the cradle 16 and aligned parallel with the axis 24 of the cradle 16. A pair of flanges 46 and 48 extend laterally from respective opposite sides of the saddle 44. The flanges 46 and 48 may be coplanar and may have respective outer side faces 50 and 52 that are parallel with each other, as may be seen best in FIG. 3 or FIG. 5. The outer faces 50 and 52 are separated from each other by a distance 54 greater than the distance 38 but small enough to permit the clamping body 14 to slide into mating relationship with the base portion 12, with the flange 46 engaged in the channel 30 and the flange 48 engaged in the channel 32 as shown in FIGS. 2, 3, and 5.

A pair of insertion stops 56 and 58 may be provided at a distal end of each of the channels 30 and 32, at the far end 60 of the base portion 12, obstructing the channels 30 and 32 by extending partially across the channels and thus limiting the distance to which the clamping body 14 may be inserted into the base portion 12 along the channels 30 and 32. The flanges 46 and 48 may define small recesses 62 and 64 to accommodate the insertion stops 56 and 58 as the clamping body 14 is inserted to the desired position.

Figure 2:
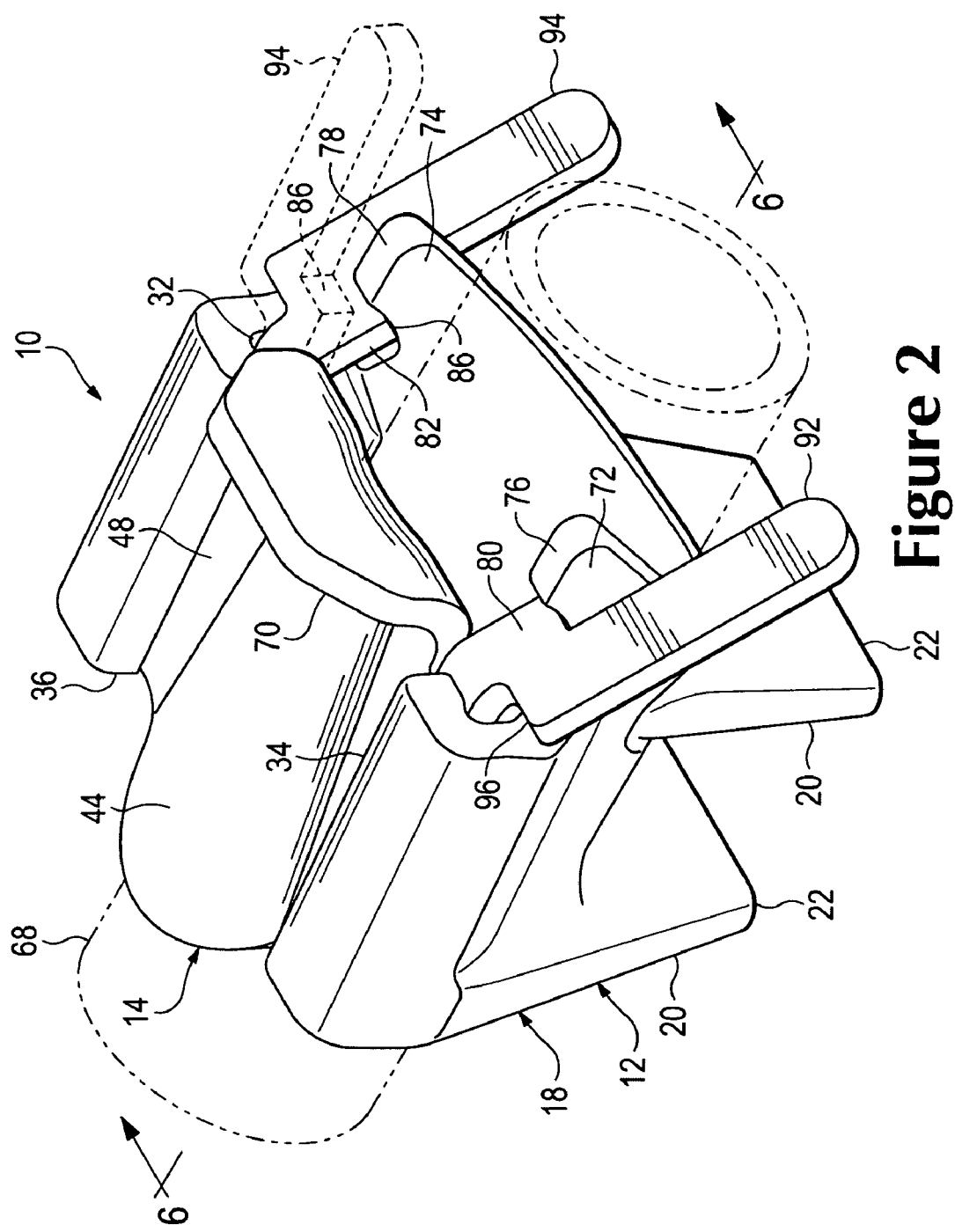
FIG. 2 is an isometric view similar to that of FIG. 1, but with the clamping body mated with the base portion and locked into position around a pipe shown in phantom lines, illustrating how the pipe anchor retains a pipe.
Figure 3:
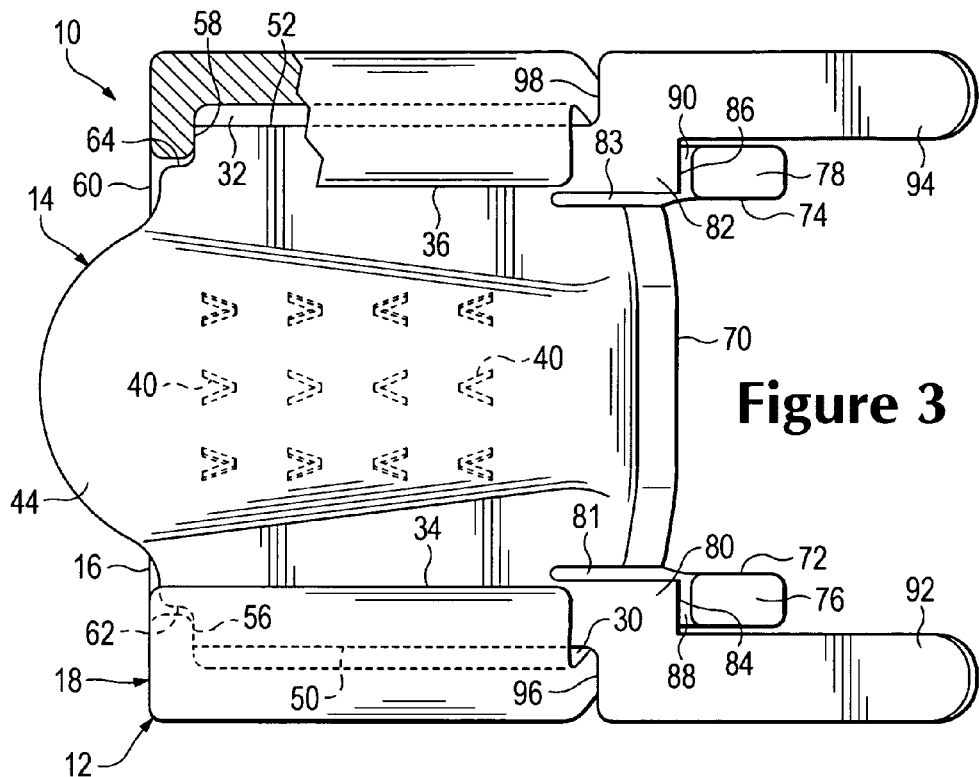
FIG. 3 is a partially cutaway top plan view of the assembly shown in FIGS. 1 and 2, with the clamping body in the form shown in FIG. 1 but located with its flanges in the channels of the base portion.

As may be seen in FIGS. 4, 5, and 6, the rails 34 and 36, and thus the longitudinal axes of channels 30 and 32, are inclined at a small angle 66 with respect to the axis 24 of the cradle 16, so that as the clamping body 14 is inserted and moved along the channels 30 and 32 the saddle 44 moves closer to the axis 24 and the bottom of the cradle 16, thus moving closer to an article such as the pipe 68, shown in phantom view in FIGS. 2, 4, and 6, to be held in the pipe anchor 10. The angle 66 may be, for example, 5 degrees, although an angle 66 in the range of about 4 to about 6 degrees is acceptable. While the flanges 46 and 48 may easily enter the near ends of the channels 30 and 32 with the pipe resting on the bottom of the cradle 16, the clamping body 14 may need to be driven toward the far end 60 of the base portion 12 as by use of a hammer striking the driving flange 70 that stands upright at the near, or rear, end of the clamping body 14. The inclination of the channels 30 and 32 results in the front, or far, end of the saddle 44 being wider than the rear end, adjacent the driving flange 70. The clamping body 14 may be manufactured by cutting and stamping metal plate to the required configuration, which may include having the driving flange 70 in the shape indicated by broken line in FIG. 4. Driving the clamping body into place by hammering may result in the driving flange 70 being bent to the position shown in solid line in FIG. 4 as the clamping body 14 is moved and locked into clamping position as shown in FIGS. 2-6 with respect to the base portion 12.

A pair of retainer legs 72 and 74 are located at the rear, or near, end of the base portion 12, aligned laterally with the channels 30 and 32, respectively. An upper end face 76 or 78 of a retainer leg 72 or 74 may be located at a height somewhat lower than the bottom surface of the adjacent rail 34 or 36, aligned roughly with the respective channel. The retainer legs 72 and 74 do not obstruct the path of the clamping body 14, and may guide it, as it may be rested atop the upper end faces 76 and 78 of the retainer legs 72 and 74 as its front end is inserted into the channels 30 and 32.

Once the flanges 46 and 48 have been inserted into the channels 30 and 32 and the clamping body 14 has been driven forward to the position shown in FIG. 3, the clamping body 14 may be retained in the required clamping position with respect to the pipe 68 or another item being held by the pipe anchor 10, by bending downward at least one of a pair of locking tabs 80 and 82 that extend rearwardly from the respective flange 46 or 48, bringing a locking face 84 or 86, or both, into contact with a retention face 88 or 90, as may be seen in FIGS. 2, 4, and 6. The locking tabs 80 and 82 are delineated and separated from the saddle 44 and the driving flange 70 by slits 81 and 83, shown best in FIG. 3. The retention face 88 or 90 may be inclined at an angle 89 of, for example, about 45 degrees with respect to the cradle axis 24, as shown in FIG. 4.

Tab extension fingers 92 and 94 extend rearwardly from the locking tabs 80 and 82, and each is offset laterally outward from the respective locking tab 80 or 82, defining shoulders 96 and 98, respectively, behind the sides 26 and 28 of the cradle 16. The shoulders 96 and 98 may act as preventer stops, in addition to or instead of the insertion stops 56 and 58, to keep the clamping body 14 from being moved too far forward by coming to bear upon the near, or rear, ends of the channels 30 and 32 as the clamping body 14 is driven into place in the base portion 12. Once the clamping body 14 is driven into place in the base portion 12, at least one of the locking tabs 80 and 82 may be bent downward, as by hammering or grasping with a wrench one of the extension fingers 92 and 94, bending it down until the respective locking face 84 or 86 is brought into contact against the retention face 88 or 90 of the retainer leg 72 or 74 on that side of the cradle 16. Each extension finger 92 and 94 extends alongside a laterally outer side of a respective one of the retainer legs 72 and 74 once the locking tabs 80 and 82 have been bent.

The clamping body 14 may be made of a suitably strong yet malleable metal, permitting the locking tabs 80 and 82 to be bent and straightened and rebent more than once, should it be necessary to remove and replace the pipe 68 during the economic life time of a railcar on which the pipe anchor 10 is mounted. For example, the clamping body 14 may be of a high strength, low-alloy, formable steel plate material with an appropriate thickness of, for example, 0.125 inch to 0.175 inch in a pipe anchor 10 designed to retain a pipe 68 having a diameter of 1.25 inch. As a particular example, 7 gauge ASTM A1011 HSLAS-F GR 50 sheet steel is suitable. Alternatively, the clamping body could be cast of AAR M-201 Grade B+ steel or forged from ASTM A668 Class G or AISI C-1040/45 steel heat treated to a minimum of 50000 psi yield strength. The inclusion of the locking tabs 80 and 82 in the clamping body 14, rather than on the base portion 12, results in it being easy to repair a the pipe anchor 10 without having to cut away the base portion 12 after failure caused by too many replacements of a pipe 68, by simply replacing the clamping body 14 with a new clamping body should the locking tabs 80 and 82, or one of them, fail as a result of being bent and straightened too many times.

Because the base portion 12 does not need to be bent in order for the pipe anchor 10 to safely and securely retain an object such as the pipe 68, it is practical for the base portion 12, including the cradle 16 and channels 30 and 32, to be made of cast or forged metal of an appropriate formulation to allow the feet 22 to be welded to a supporting structure. For example, the AAR M-201 Grade B+ cast steel mentioned above with respect to the clamping body 14 may be appropriate, as may the ASTM Class G or AISI C-1040/45 steel heat treated to a minimum of 50000 psi yield strength for a forged base portion 12.

A pipe anchor 100, shown in FIGS. 7 and 8, is generally similar to the pipe anchor 10, and so it will be described in detail only so far as there are significant differences. As may be seen most clearly in FIG. 7, the clamping body 102 may include a gusset portion 104 extending up from the saddle 44' to the driving flange 70'. The gusset 104 may be a short tunnel-like or trough-like bent portion of the clamping body 102, to act as a brace for the driving flange 70' as it is hammered to drive the clamping body 102 into place in the base portion 12'. The rails, such as the rail 34' shown in FIGS. 7 and 8, forming the channels to receive the flanges such as the flange 46' may extend rearwardly beyond the channels toward the retainer leg 72', and an engagement face 106 may be provided at the rear, or near, end of each channel, to be contacted by the shoulder 96 to limit the distance to which the clamping body 102 may be driven into the base portion 12'. A retention face 88' of the retainer leg 72' may include a bump 108 to act as a detent to help prevent a locking face 84' from becoming disengaged.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. A pipe anchor comprising:
   (a) a base including:
      (i) a cradle defining a cradle axis and having a pair of opposite sides and adapted to receive an elongate article oriented along the axis;
      (ii) a pair of parallel channels facing toward each other, each said channel being located on and extending along a respective one of said opposite sides of said cradle;
      (iii) a mounting body supporting said cradle and adapted to be mounted on a structural member; and
      (iv) a retainer leg located at a first end of said cradle and including a retention face spaced apart from a first end of one of said pair of channels;
   (b) a clamping body mated with said base, said clamping body including a saddle and a pair of parallel flanges located on respective opposite sides of said saddle, each said flange being located in and extending along a respective one of said channels; and
   (c) a locking tab extending from a first end of one of said flanges and resting in contact against said retention face of said retainer leg when said locking tab has been bent toward said mounting body, said locking tab thereby keeping said clamping body mated with said base when said tab has been bent into contact against said retention face.

2. The pipe anchor of claim 1, said parallel channels defining respective channel axes parallel with each other and inclined at a predetermined angle to said cradle axis.

3. The pipe anchor of claim 1 wherein said retention face of said retainer leg is inclined with respect to said cradle axis.

4. The pipe anchor of claim 1 wherein said retainer leg has an upper face aligned with said channel so as to guide said flange into said channel.

5. The pipe anchor of claim 1 wherein said locking tab includes a laterally offset extension finger extending away from said saddle alongside said retainer leg.

6. The pipe anchor of claim 5 wherein said extension finger of said locking tab extends beyond said retainer leg when said locking tab has been bent into contact against said retention face.

7. The pipe anchor of claim 5 wherein said locking tab extension finger includes a preventer stop.

8. The pipe anchor of claim 1 including an elongate locking tab extending from a near end of each said flange.

9. The pipe anchor of claim 1 wherein said base is of cast metal.

10. The pipe anchor of claim 1 wherein said clamping body includes a driving flange located at said near end thereof.

11. A pipe anchor comprising:
    (a) a base including:
       (i) a cradle defining a cradle axis and having a pair of opposite sides and adapted to receive an elongate article oriented along the axis;
       (ii) a pair of parallel channels facing toward each other, each said channel being located on and extending along a respective one of said opposite sides of said cradle, one of said channels including an insertion stop located therein adjacent a distal end thereof;
       (iii) a mounting body supporting said cradle and adapted to be mounted on a structural member; and
       (iv) a retainer leg located at a first end of said cradle and including a retention face spaced apart from a first end of one of said pair of channels;
    (b) a clamping body mated with said base, said clamping body including a saddle and a pair of parallel flanges located on respective opposite sides of said saddle, each said flange being located in and extending along a respective one of said channels; and
    (c) a locking tab extending from a first end of one of said flanges and resting in contact against said retention face of said retainer leg when said locking tab has been bent toward said mounting body, said locking tab thereby keeping said clamping body mated with said base when said tab has been bent into contact against said retention face.

12. The pipe anchor of claim 11 wherein said insertion stop extends only partially across said channel.

13. A pipe anchor comprising:
    (a) a base including:
       (i) a cradle defining a cradle axis and having a pair of opposite sides and adapted to receive an elongate article oriented along the axis;
       (ii) a pair of parallel channels facing toward each other, each said channel being located on and extending along a respective one of said opposite sides of said cradle and each said channel including a respective insertion stop located therein near a distal end thereof;
       (iii) a mounting body supporting said cradle and adapted to be mounted on a structural member; and
       (iv) a retainer leg located at a first end of said cradle and including a retention face spaced apart from a first end of one of said pair of channels;
    (b) a clamping body mated with said base, said clamping body including a saddle and a air of parallel flanges located on respective opposite sides of said saddle, each said flange being located in and extending along a respective one of said channels; and
    (c) a locking tab extending from a first end of one of said flanges and resting in contact against said retention face of said retainer leg when said locking tab has been bent toward said mounting body, said locking tab thereby keeping said clamping body mated with said base when said tab has been bent into contact against said retention face.

14. A pipe anchor comprising:
    (a) a base including:
       (i) a cradle defining a cradle axis and having a pair of opposite sides and adapted to receive an elongate article oriented along the cradle axis, said cradle including pipe-engaging teeth extending radially inward within said cradle;
       (ii) a pair of parallel channels facing toward each other, each said channel being located on and extending along a respective one of said opposite sides of said cradle;

(iii) a mounting body supporting said cradle and adapted to be mounted on a structural member; and
(iv) a retainer leg located at a first end of said cradle and including a retention face spaced apart from a first end of one of said pair of channels;
(b) a clamping body mated with said base, said clamping body including a saddle and a pair of parallel flanges located on respective opposite sides of said saddle, each said flange being located in and extending along a respective one of said channels; and
(c) a locking tab extending from a first end of one of said flanges and resting in contact against said retention face of said retainer leg when said locking tab has been bent toward said mounting body, said locking tab thereby keeping said clamping body mated with said base when said tab has been bent into contact against said retention face.

15. An assembly for attaching a slender article to a structural member, the assembly comprising:
(a) a base including:
(i) a cradle defining a cradle axis and having a pair of opposite sides and adapted to receive an elongate slender article oriented along the axis;
(ii) a pair of parallel channels facing toward each other, each said channel being located on and extending along a respective one of said opposite sides of said cradle;
(iii) a mounting body supporting said cradle and adapted to be mounted on a structural member; and
(iv) a retainer leg located at a first end of said cradle and including a retention face spaced apart from a first end of one of said pair of channels;
(b) a clamping body mated with said base, said clamping body including a saddle and a pair of parallel flanges located on respective opposite sides of said saddle, each said flange being located in and extending along a respective one of said parallel channels; and
(c) a locking tab extending from a first end of one of said flanges and resting in contact against said retention face of said retainer leg when said locking tab has been bent toward said mounting body, said locking tab thereby keeping said clamping body mated with said base when said tab has been bent into contact against said retention face.

* * * * *